C. J. GARTLAND.
COMBINATION TOOL.
APPLICATION FILED JULY 21, 1915.

1,163,230.

Patented Dec. 7, 1915.

WITNESSES:
Charles Pickles
Thos Castberg

INVENTOR
Charles J. Gartland,
BY Strong & Townsend
ATTORNEYS

UNITED STATES PATENT OFFICE.

CHARLES J. GARTLAND, OF SAN FRANCISCO, CALIFORNIA.

COMBINATION-TOOL.

1,163,230.   Specification of Letters Patent.   Patented Dec. 7, 1915.

Application filed July 21, 1915.  Serial No. 41,070.

*To all whom it may concern:*

Be it known that I, CHARLES J. GARTLAND, a citizen of the United States, residing in the city and county of San Francisco and State of California, have invented new and useful Improvements in Combination-Tools, of which the following is a specification.

This invention relates to a tool which is useful for handling goods, packages, such as boxes, bales, crates and barrels, and in which several different operations may be required, which can be carried out with the single tool.

It consists of a handle and a shank upon which the various necessary implements are formed and so related that either of them may be used as occasion offers.

Figure 1:
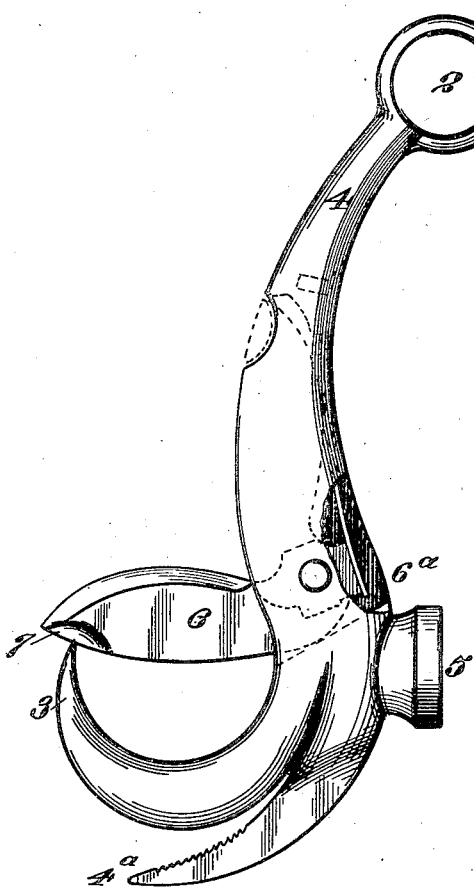
Figure 2:
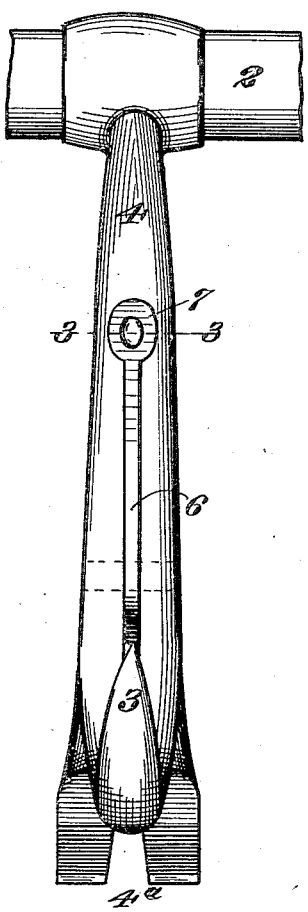
Figure 3:
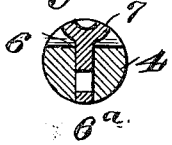

Referring to the accompanying drawings for a more complete explanation of this invention: Figure 1 is a side elevation of this invention. Fig. 2 is an edge view of the invention. Fig. 3 is a cross section on line 3—3 of Fig. 2.

The curved shank 4 projects from a transverse handle 2, by which operation of the tool may be readily effected. From the outer portion the curved pointed hook portion 3 projects and may be engaged with anything which it is desired to move by a direct pull.

At the lower part of the hook, the shank commences to separate, and is flattened and curved up around the back of the hook to form a claw 4ª with sufficient space between it and the hook to admit the head of a nail, which it might be necessary to draw. The interior of this claw may be corrugated as shown.

The fulcrum 5 about which the claw may operate, projects at the base of the claw and the hook, and at the same time is so formed that it may serve as a hammer head. The shank 4 is slotted from front to back, and in this slot is hinged a cutting blade 6 and its controlling spring 6ª. This blade may be opened toward the point of the hook with the cutting edge presented toward the handle 2. The back of the blade has a concave socket 7 formed upon it near the outer end, and when the blade is opened this socket contacts with the point of the hook 3 and is thus held in place so that the edge of the blade may be used to cut a cord or rope, it also serves as a keeper for the hook. The sides of the channel in the shank are counter sunk or hollowed out to receive the enlargement 7 when the blade is closed, and this part 7 also serves as a means to easily open the blade. In handling goods the hook is always available to pull the article, turn, and move it at will.

A protruding nail may be driven home, or extracted, by slight changes of position of the tool and if cords or bindings are to be cut, the blade may be instantly opened in position to do the work, being well braced against the point of the hook, and the handle is so placed that all necessary power can be applied to the work.

Having thus described my invention, what I claim and desire to secure by Letters Patent is—

1. An implement including a shank having a rigid outwardly projecting abutment at one side thereof having its outer end free and spaced from the shank, said shank being longitudinally slotted, a blade pivoted to the shank and movable into the slot and having a socket in its back adjacent the outer end of the blade, and a spring in the slot connected to the shank and engaged with the blade, said blade when in cutting position having its socket receiving said free outer end of the abutment so as to be held by the latter at substantially right angles to the shank.

2. An implement including a longitudinally slotted shank having a rigid lateral outwardly projecting abutment at one side of the shank, and a pivoted blade receivable in the slot and when in cutting position having its back at the outer end portion thereof engageable with the abutment so as to be held by the latter in cutting position and at approximately right angles to the shank.

3. An implement including a longitudinally slotted shank having an abutment at one side of the shank, and a pivoted blade receivable in the slot and when in cutting position having its back engageable with the abutment so as to be held by the latter in cutting position and at approximately right angles to the shank, said shank having an extension related thereto so as to form a lateral fulcrum point about which the shank may move when cutting with the blade.

4. In combination with a shank having a hook, a pivoted blade borne by the shank and movable to have its back engaged by the hook and to extend across the hook mouth whereby the hook serves to hold the blade in cutting position and the blade serves to close the hook mouth.

5. In combination with a shank having a rigid lateral projection located at approximately right angles thereto, a blade pivoted to the shank and being movable to have its back engaged with the projection whereby the latter serves to hold the blade at approximately right angles to the shank.

In testimony whereof I have hereunto set my hand in the presence of two subscribing witnesses.

CHARLES J. GARTLAND.

Witnesses:
 JOHN H. HERRING,
 W. W. HEALEY.